(12) United States Patent
Brabander et al.

(10) Patent No.: US 6,950,098 B2
(45) Date of Patent: Sep. 27, 2005

(54) METHOD AND SYSTEM FOR REAL TIME CORRECTION OF AN IMAGE

(75) Inventors: Gino De Brabander, Nieuwkerken-Was (BE); Lode De Paepe, Sint-Amandsberg (BE)

(73) Assignee: Barco N.V., Kortrijk (BE)

( * ) Notice: Subject to any disclaimer, the term of this patent is extended or adjusted under 35 U.S.C. 154(b) by 522 days.

(21) Appl. No.: 09/966,009

(22) Filed: Sep. 28, 2001

(65) Prior Publication Data

US 2003/0006980 A1 Jan. 9, 2003

(30) Foreign Application Priority Data

Jul. 3, 2001 (EP) ............................................ 01870151

(51) Int. Cl.[7] ................................................ G09G 5/00
(52) U.S. Cl. ........................ 345/207; 345/690; 345/87; 324/753; 324/770
(58) Field of Search .............................. 345/87, 88, 89, 345/690, 207, 697; 324/753, 770

(56) References Cited

U.S. PATENT DOCUMENTS

| | | | | | |
|---|---|---|---|---|---|
| 5,007,731 A | * | 4/1991 | Butefisch | .................... | 356/28.5 |
| 5,406,213 A | * | 4/1995 | Henley | ........................ | 324/753 |
| 5,465,052 A | * | 11/1995 | Henley | ........................ | 324/770 |
| 5,504,438 A | * | 4/1996 | Henley | ........................ | 324/770 |
| 5,597,223 A | * | 1/1997 | Watanabe et al. | ............. | 353/97 |
| 5,850,205 A | | 12/1998 | Blouin | | |
| 6,052,166 A | * | 4/2000 | Chikazawa | .................. | 349/116 |
| 6,081,073 A | | 6/2000 | Salam | | |
| 6,147,664 A | | 11/2000 | Hansen | | |
| 6,670,603 B2 | * | 12/2003 | Shimada et al. | ............. | 250/235 |
| 2001/0008395 A1 | * | 7/2001 | Yamamoto et al. | ......... | 345/102 |
| 2002/0018249 A1 | * | 2/2002 | Yamakawa et al. | ......... | 358/475 |
| 2003/0117714 A1 | * | 6/2003 | Nakamura et al. | .......... | 359/649 |

FOREIGN PATENT DOCUMENTS

DE 197 46 426 A1 4/1999

* cited by examiner

*Primary Examiner*—Xiao Wu
(74) *Attorney, Agent, or Firm*—Barnes & Thornburg

(57) ABSTRACT

The present invention relates to a system and method for real time correction of light output and/or colour of an image displayed on a display device. The system comprises: a display device (1) comprising an active display area (6) for displaying the image, an image forming device (2) and an electronic driving system (4) for driving the image forming device (2), an optical sensor unit (10) comprising an optical aperture (21) and a light sensor (22) having an optical axis, to make optical measurements on a light output from a representative part of the active display area (6) of the image forming device (2) and generating optical measurement signals (11) therefrom, a feedback system (12) receiving the optical measurement signals (11) and on the basis thereof controlling the electronic driving system (4). The optical aperture (21) of the optical sensor unit (10) has an acceptance angle such that at least 50%, alternatively 60%, alternatively 70%, alternatively 75% of the light received by the sensor (22) comes from light travelling within 15° of the optical axis of the light sensor (22).

28 Claims, 6 Drawing Sheets

METHOD AND SYSTEM FOR REAL TIME CORRECTION OF AN IMAGE

TECHNICAL FIELD OF THE INVENTION

The present invention relates to a system and method for real time correction of light output and/or colour of an image displayed on a display device of the type having a display area which has a brightness versus voltage characteristic which is dependent on temperature and ageing of the display device, such as for example LCD (liquid crystal display) devices, plasma devices, CRT, electronic displays, rear projection systems.

It applies more particularly, but not exclusively, to transmissive type liquid crystal displays intended to be observed along a given axis of vision. Such is the case in particular in computer screens and in instrument panels of vehicles such as aircraft.

More particularly, when a plurality of, for example, LCD screens are put together to form one or a plurality of images, it is desired that each of the LCD screens has the same appearance.

BACKGROUND OF THE INVENTION

At present, LCD displays are often equipped with means for adjusting the contrast, whereby such adjustment is carried out at the beginning of a phase of use of the display. The contrast is not adjusted anymore during the use of the display.

JP-8292129 describes a separate measurement device which is put on the display at the moments when measurements are carried out only. Such a sensor for measuring display light has any one of an optical system, an aperture and an optical fibre which are mounted on a display surface. Among all the light beams emitted from the display surface, only the light corresponding to the optimum observing angle is applied into a sensor element. The sensor described does not allow for compactness and integration. The height of the sensor is large, as, in order to apply only the light corresponding to the optimum observing angle to the sensor element, the sensor element has to be placed quite some distance away from the aperture, and thus from the screen. The sensor also covers a quite large area. The sensor described is not designed for real-time use in parallel with the application displayed on the screen. For instance it would be impractical for a mobile phone display.

For some applications it is preferred to have a measurement device which can stay on the display all the time, so as to be able to continuously measure the light output, and thus continuously correct the light output and/or the colour of a displayed image.

From EP-0313331 an apparatus for controlling the brightness and contrast of a liquid crystal display during its actual use is known. A predetermined light level is produced and transmitted through an LCD panel by a light emitting diode. At the other side of the panel, the light transmitted through the panel is sensed by a sensor, and correspondingly a signal representative thereof is produced. This signal is monitored in real time and is used for adjusting in real time the grey scale levels of the panel. The light emitting diode and the sensor are positioned on opposite surfaces of the LCD panel, under a light shielding material. This light shielding material shields the viewer from the light generated in that portion of the screen, but also shields the sensor from ambient light. A disadvantage of this solution is that it cannot be retrofitted on existing screens. Furthermore, such a covered test pixel, although not having problems with ambient light, masks too much of the LCD.

U.S. Pat. No. 5,162,785 and DE-4129846 also describe a device for optimising the contrast of an LCD. The LCD panel comprises a display area and a separate test zone. A sensor observes the test zone. Both the sensor and the test zone are protected from ambient light by an optical mask.

U.S. Pat. No. 5,490,005 describes a light sensor placed on an own light source (LED) of a display device. A first disadvantage is that this cannot be implemented on commercially available LCD panels. A further disadvantage is that the feedback loop does not incorporate the backlight that is used for the active image content, and therefore this structure is not very precise: it does not measure the overall result of all image defining elements (such as the LCD itself, the backlight, filters, temperature etc.).

SUMMARY OF THE INVENTION

It is an object of the present invention to overcome the disadvantages mentioned above.

This object is accomplished by a method and a system according to the present invention.

The present invention provides a system for real time correction, through optical feedback, of light output and/or colour of an image displayed on a display device. Light output includes backlight, contrast and/or brightness. The system according to the present invention comprises:

a display device comprising an active display area for displaying the image, an image forming device, such as e.g. a transmissive or reflective LCD in the case of an LCD device or a phosphor in case of a CRT, and an electronic driving system for driving the image forming device, an optical sensor unit comprising an optical aperture and a light sensor having an optical axis, to make optical measurements on a light output from a representative part of the active display area of the image forming device and generating optical measurement signals therefrom, a feedback system receiving the optical measurement signals and on the basis thereof controlling the electronic driving system. The optical aperture of the optical sensor unit has an acceptance angle such that at least 50% of the light received by the sensor comes from light travelling within 15° of the optical axis of the light sensor (that is the acceptance angle of the sensor is 30°). In other words the acceptance angle of the sensor is such that the ratio between the amount of light used for control which is emitted or reflected from the display area at a subtended acceptance angle of 30° or less to the amount of light used for control which is emitted or reflected from the display area at a subtended acceptance angle of greater than 30° is X:1 where X is 1 or greater. Under some circumstances it may be advantageous to have an acceptance angle such that at least 60%, alternatively at least 70% or at least 75% of the light received by the light sensor comes from light travelling within 15° of the optical axis of the light sensor.

In another aspect of the invention a system for real time correction of light output and/or colour of an image displayed on a display device is provided, comprising:

a display device comprising an active display area for displaying the image, an image forming device, such as e.g. a transmissive or reflective LCD in case of an LCD device or a phosphor in case of a CRT, and an electronic driving system for driving the image forming device, an optical sensor unit comprising an optical aperture and a light sensor having an optical axis, to make optical measurements on a light output from a representative part of he active display area of the image forming device and generating optical measurement signals therefrom, and a feedback system receiving the optical measurement signals and on the basis thereof controlling the electronic driving system, the optical aperture of the optical sensor unit has an acceptance angle such that light received at the sensor at an angle with the optical axis of the light sensor equal to or greater than 10° is attenuated by at least 25%, light received at an angle equal to or greater than 20° is attenuated by at least 50 or 55% and light arriving at an angle equal to or greater than 35° is attenuated by at least 80 or 85%.

The system according to the present invention is meant to be used in real time, thus during display of a main application. No test pattern is necessary, although a test pattern may be used. The main application is not disturbed when the measurement in made.

The optical measurements are non-differential, i.e. ambient light and real light emitted by the active display area are not measured separately. Direct ambient light is not measured, nor does it influence the measurement appreciably. Indirect ambient light (i.e. ambient light reflected by the display) has a contribution in the total luminance output of the electronic display, and will be measured.

In case it is the intention to adjust the luminance of a display relative to the ambient light, the combination of the invention with a separate ambient light sensor is possible. In that case, a system according to the present invention measures the luminance emitted by the screen, and the ambient light sensor measures the ambient light. The display's luminance can then be adjusted in proportion to the difference between both.

Preferably, the optical measurements are luminance measurements. The light output correction may then comprise luminance and/or contrast correction. The optical measurements may also be colour measurements, in which case a colour correction may be carried out.

The feedback system preferably comprises a comparator/amplifier for comparing the optical measurement signals, measured luminance or colour values, with a reference value, and a regulator for regulating a backlight control and/or a video contrast control and/or a video brightness control and/or a colour temperature, so as to reduce the difference between the reference value and the measured value and bring this difference as close as possible to zero.

The optical sensor unit of the present invention preferably comprises a light guide between the optical aperture and the light sensor. This light guide may be e.g. a light pipe or an optical fibre.

Preferably, the representative part of the active display area of the image forming device is less than 1% of the total area of the active display area of the image forming device, preferably less than 0.1%, and still more preferred less than 0.01%.

According to a preferred embodiment, the optical aperture of the optical sensor unit masks a portion of the active display area, while the light sensor itself does not mask any part of the active display area. The light output from the front face of the active display area of a display device is continuously measured with a minimal coverage of the viewed image. The light sensor may be brought to the back of the display area or to a side thereof, thereby needing a height above the screen area preferably less than 5 mm. Therefore, a distance between the optical aperture and the light sensor, needed to reject ambient light during measurement, is not created by a distance out of the screen.

The area measured on the screen is composed of a number of active pixels of the active display area. The area of active pixels measured on the screen is preferably not larger than 6 mm×4 mm. For example for a mobile phone screen, with typical dimensions of the active display area of 50 mm×80 mm (third generation mobile phone), a measurement zone of 6 mm×4 mm constitutes 0.6% of that active display area. For a laptop screen with an active display area with dimensions of 2459 mm×1844 mm (a 12.1 inch screen), a measurement zone of 6 mm×4 mm constitutes 0.0005% of that active display area.

No dedicated test pixels are necessary, any pixels in the active display area can be used for carrying out optical measurements thereupon. A test patch may be generated and superimposed on the active pixels viewed by the sensor, or the sensor may view a part of the real active image. This makes it possible for the system to be retrofitted on any existing display devices. It can be combined with standard displays such as AM-LCD (Active Matrix Liquid Crystal Display) without the need for a dedicated light source or backlight. Furthermore, parts of the display device, such as the screen, can be easily replaced.

Preferably, a housing of the optical sensor unit stands out above the active display area by a distance lower than 0.5 cm.

The present invention also provides a method for real time correction, through optical feedback, of light output and/or colour of an image displayed on a display device. The method comprises the steps of:

displaying the image on an active display area on the display device, making optical measurements on light emitted from a representative part of the active display area and generating optical measurement signals therefrom, and controlling the display of the image on the active display area in accordance with the optical measurement signals. The step of making optical measurements comprises selecting light such that the ratio between the amount of light used for control which is emitted or reflected from the display area at a subtended acceptance angle of 30° or less to the amount of light used for control which is emitted or reflected from the display area at a subtended acceptance angle of greater than 30° is X:1 where X is 1 or greater.

In a method according to the present invention, comprising the steps of displaying the image on an active display area on the display device, making optical measurements on light emitted from a representative part of the active display area and generating optical measurement signals therefrom, and controlling the display of the image on the active display area in accordance with the optical measurement signals, the step of making optical measurements comprising selecting light for use in the control step by attenuating light travelling at angles with a normal to the active display area which are equal to or larger than 10° by at least 25%, attenuating light travelling at angles with a normal to the active display area which are equal to or larger than 20° by at least 50 or 55%, and attenuating light travelling at angles with a normal to the active display area which are equal to or larger than 35° by at least 80 or 85%.

By the method of the present invention, a controlled light output and/or correct absolute luminance and colour (Y, x, y) readings can be obtained from a display device.

The method for correction of an image is used in real time, i.e. in parallel with a running application. The method is intervention free, it does not require input from a user.

Preferably, the optical measurements carried out are luminance measurements. In that case, light output correction may comprise luminance and/or contrast correction. Alternatively, the optical measurements carried out are colour measurements, in which case light output correction comprises colour correction of the displayed image.

Controlling the display of the image in accordance with the optical measurement signals is preferably done by comparing the measurement signals with a reference value, and regulating a backlight controller and/or video contrast control and/or video brightness control and/or colour temperature so as to reduce the difference between the reference value and the measurement signals and bring this difference as close as possible to zero.

Preferably, the step of making optical measurements furthermore comprises a step of transmitting the light emitted from the active display area from within the active display area to outside the active display area.

Other features and advantages of the present invention will become apparent from the following detailed description, taken in conjunction with the accompanying drawings, which illustrate, by way of example, the principles of the invention.

In the different drawings, the same reference figures refer to the same or analogous elements.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. In the following the acceptance angle of a sensor refers to the angle subtended by the extreme light rays which can enter the sensor. The angle between the optical axis and the extreme rays is therefore usually half of the acceptance angle.

Figure 1A:
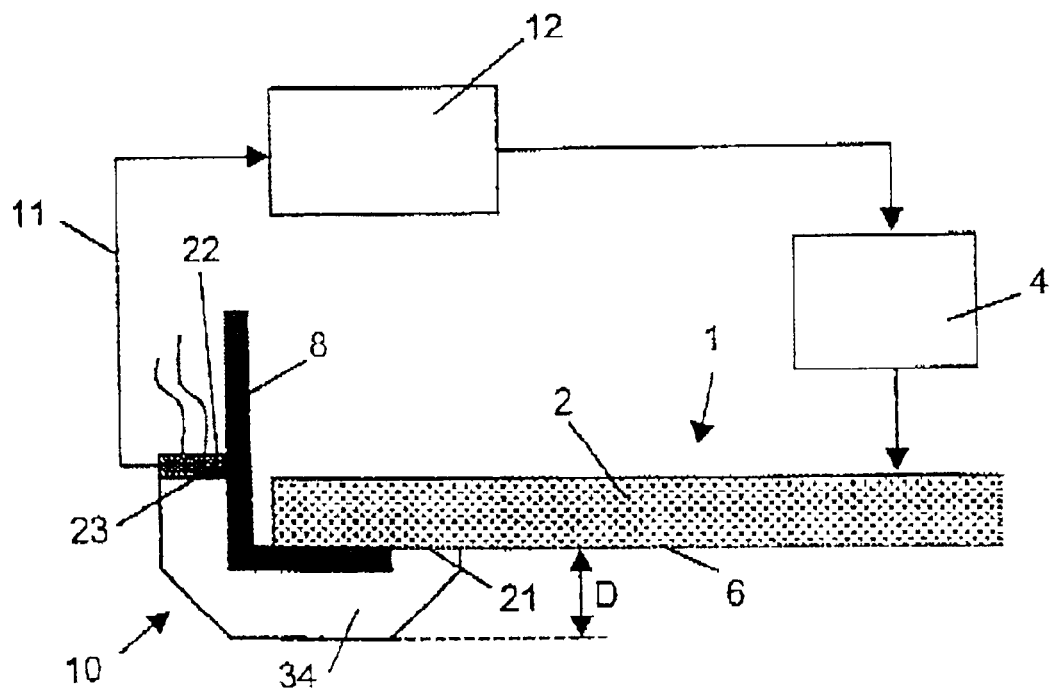
FIG. 1A is a top view and FIG. 1B is a front view of a part of an LCD screen provided with an optical sensor unit according to the present invention.
Figure 1B:
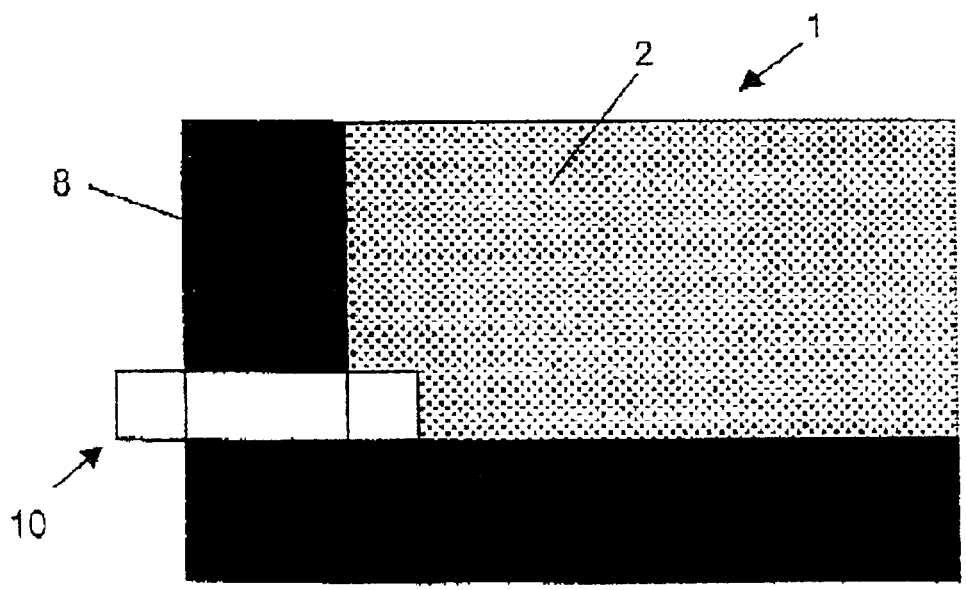

FIG. 1A and FIG. 1B are a top view and a front view respectively of a part of an LCD display device 1 provided with an embodiment of an optical sensor unit 10 according to the present invention.

An LCD display device 1 comprises an LCD panel 2 and an electronic driving system 4 for driving the LCD panel 2 to generate and display an image. The display device 1 has an active display area 6 on which the image is displayed. The LCD panel 2 is kept fixed in an LCD panel bezel 8.

According to the present invention, a display device 1 is provided with an optical sensor unit 10 to make optical measurements on a light output from a representative part of the LCD panel 2. Optical measurements signals 11 are generated from those optical measurements.

A feedback system 12 receives the optical measurement signals 11, and controls the electronic driving system 4 on the basis of those signals.

Several ways exist to realise the optical sensor unit 10. In all cases, the optical sensor unit 10 is permanently or removably fixed to (or adjacent to) the active display area 6. The whole of the optical sensor unit 10 can be calibrated together and can also be interchangeable.

Typically, the optical sensor unit 10 has a light entrance plane or optical aperture 21 and a light exit plane 23. It can also have internal reflection planes. The light entrance plane 21 preferably has a stationary contact with the active display area 6 which is light tight for ambient light. If the contact is not light tight it may be necessary to compensate for ambient light by using an additional ambient light sensor which is used to compensate for the level of ambient light.

Preferably, the optical sensor unit 10 stands out above the active display area a distance D of 5 mm or less.

Figure 2:
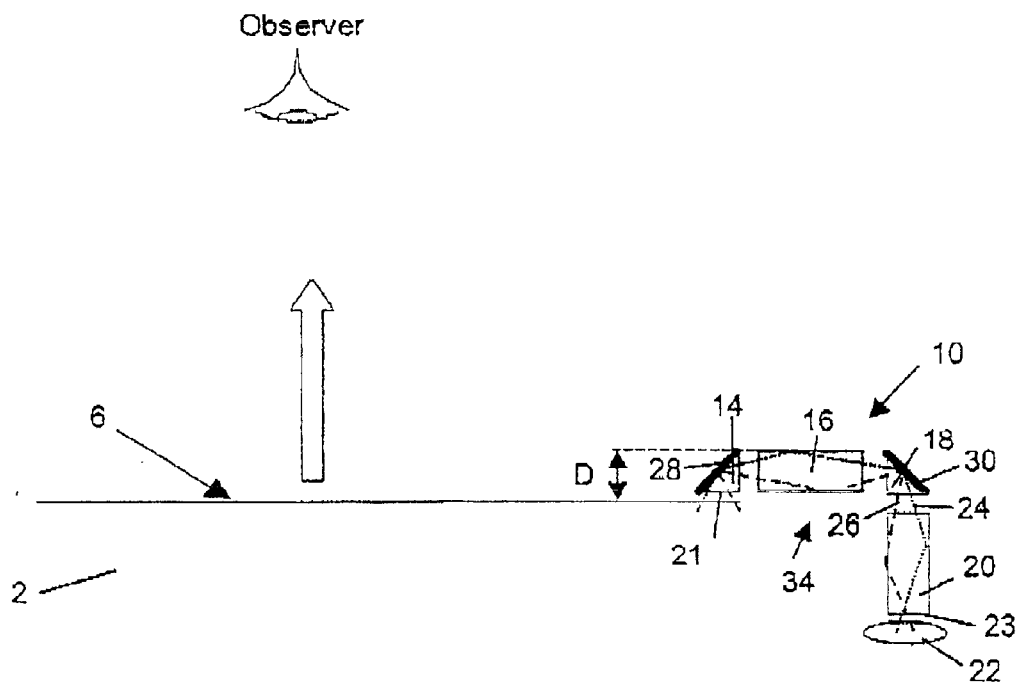
FIG. 2 shows a first embodiment of an optical sensor unit according to the present invention, the unit comprising a light guide being assembled of different pieces of PMMA.

According to a first embodiment, as shown in FIG. 2, the optical sensor unit 10 comprises an optical aperture 21, a photodiode sensor 22 and in between, as a light guide 34, made from, for example, massive PMMA (polymethyl methacrylate) structures 14, 16, 18, 20, of which one presents an aperture 21 to collect light and one presents a light exit plane 23. PMMA is a transparent (more than 90% transmission), hard and stiff material. The skilled person will appreciate that other materials may be used, e.g. glass.

The massive PMMA structures 14, 16, 18, 20 serve for guiding light rays using total internal reflection. The PMMA structures 14 and 18 deflect a light bundle over 90°. The approximate path of two light rays 24, 26 is shown in FIG. 2.

The oblique parts of PMMA structures 14 and 18 are preferably metallised 28, 30 in order to serve as a mirror. The other surfaces do not need to be metallised as light is travelling through the PMMA structure using total internal reflection.

In between the different PMMA structures 14, 16, 18 and 20 there is an air gap. At these interfaces, stray light (which is light not emitted by the display device) can enter the light guide 34.

This first embodiment has the disadvantage that it is rather complex to realise. Furthermore, stray light or ambient light can enter the light guide 34 and thus diminish the signal to noise ratio of the measured light output.

Figure 3:
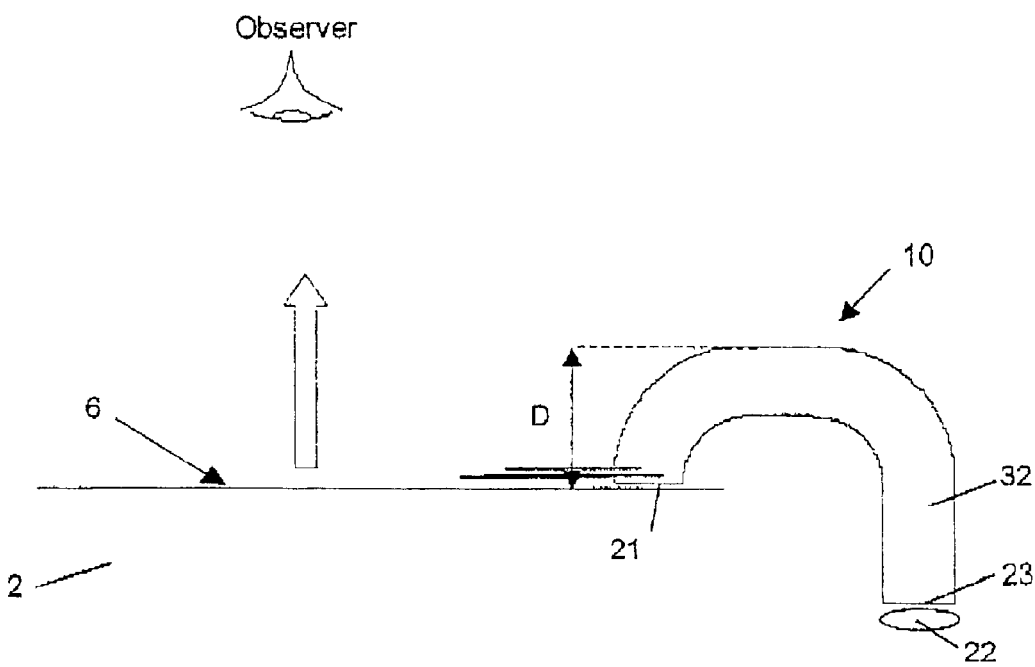
FIG. 3 shows a second embodiment of an optical sensor unit according to the present invention, the unit comprising a light guide with optical fibres.

A second embodiment of an optical sensor unit 10 according to the present invention is shown in FIG. 3. It is a fiber-optic implementation. The optical sensor unit 10 comprises an optical aperture 21 and a light sensor 22, with a bundle 32 of optical fibres therebetween. The optical fibres are preferably fixed together or bundled (e.g. glued), and the end surface is polished to accept light rays under a limited angle only (as defined in the attached claims).

This embodiment shows the disadvantage that bending the bundle of optical fibres with a small radius is often not practical. Therefore, the distance D the optical sensor unit 10 extends out of the display area 6 of the display device 1 is quite large. Furthermore, light leakage can be present, especially at the surface where the optic fibre is bent over 90°. Ambient light may enter the light guide 34, although this can easily be limited by applying a light screening material directly or indirectly to the surface of the fibre bundle. By "directly" is meant that the screening material and the fibre bundle are non-separable, e.g. damped metal on the fibre bundle. By "indirectly" is meant that the screening material and the fibre bundle are separable, e.g. a removable flexible pipe with inside damped metal, which is placed around the fibre bundle.

Figure 4:
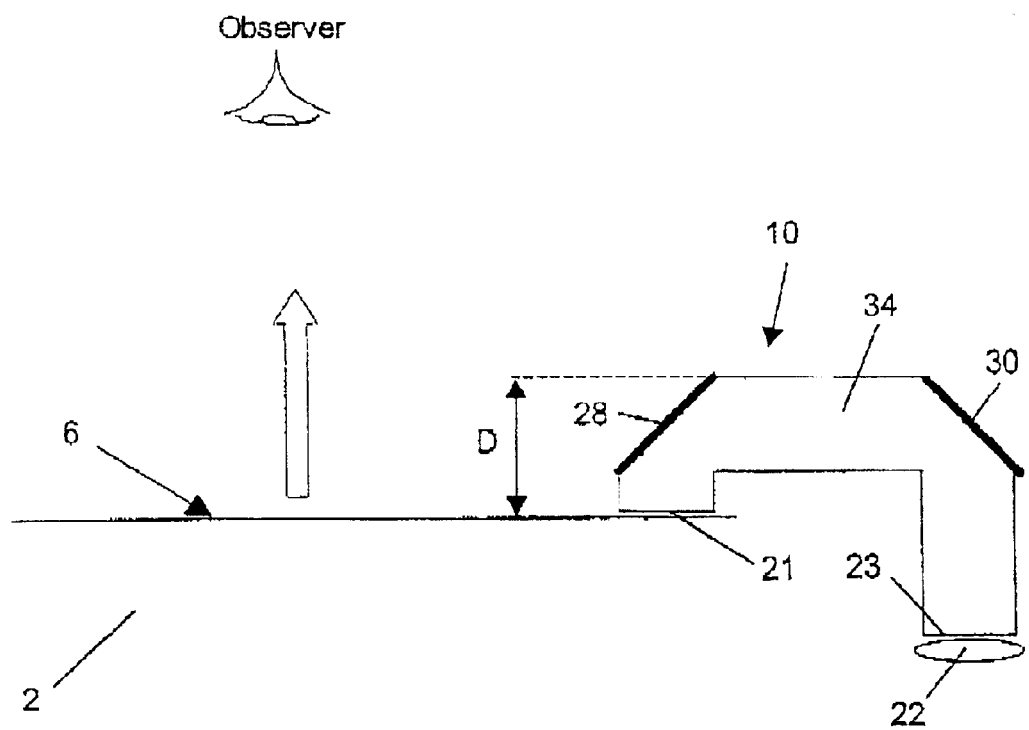
FIG. 4 shows a third embodiment of an optical sensor unit according to the present invention, the unit comprising a light guide made of one single piece of PMMA.
Figure 5:
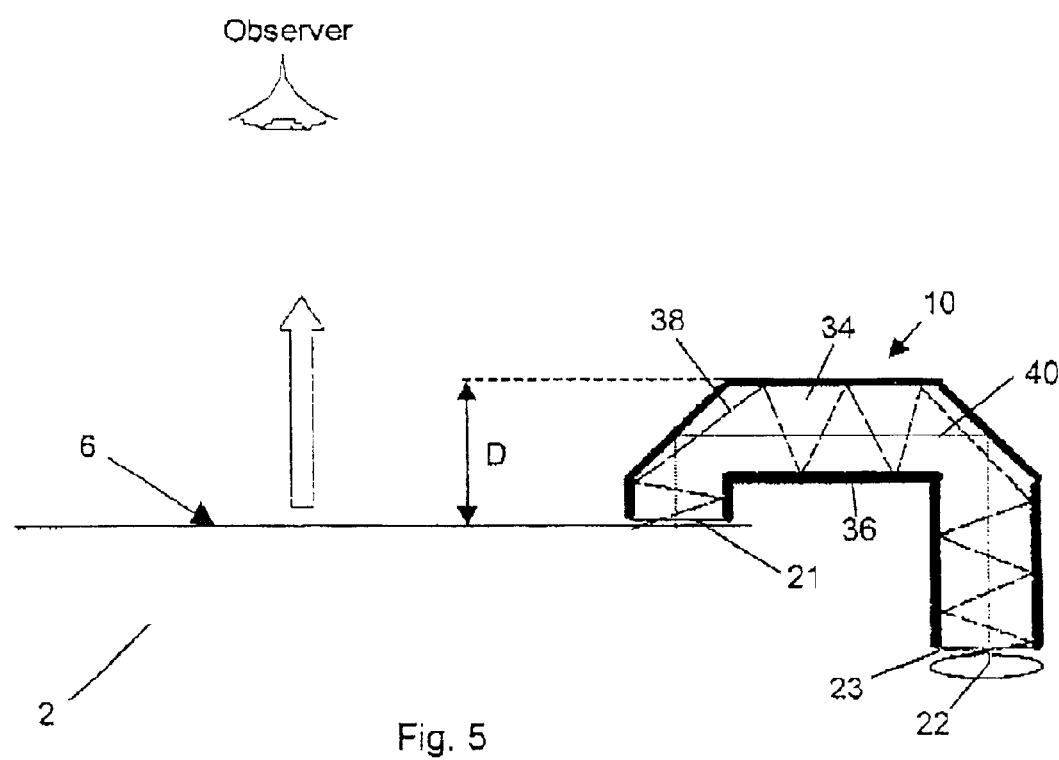
FIG. 5 shows the light guide of FIG. 4, this light guide being coated with a reflective coating.
Figure 6:
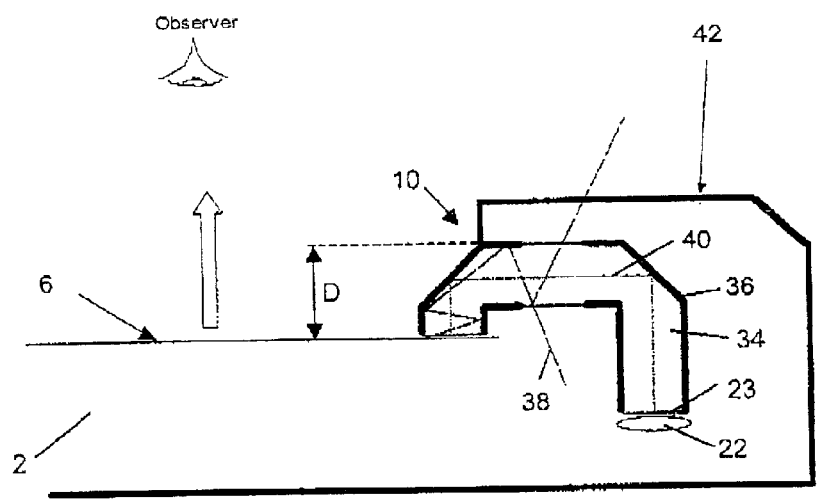
FIG. 6 shows the light guide of FIG. 4, this light guide being partially coated with a reflective coating, and the light guide being shielded from ambient light by a housing.
Figure 7:
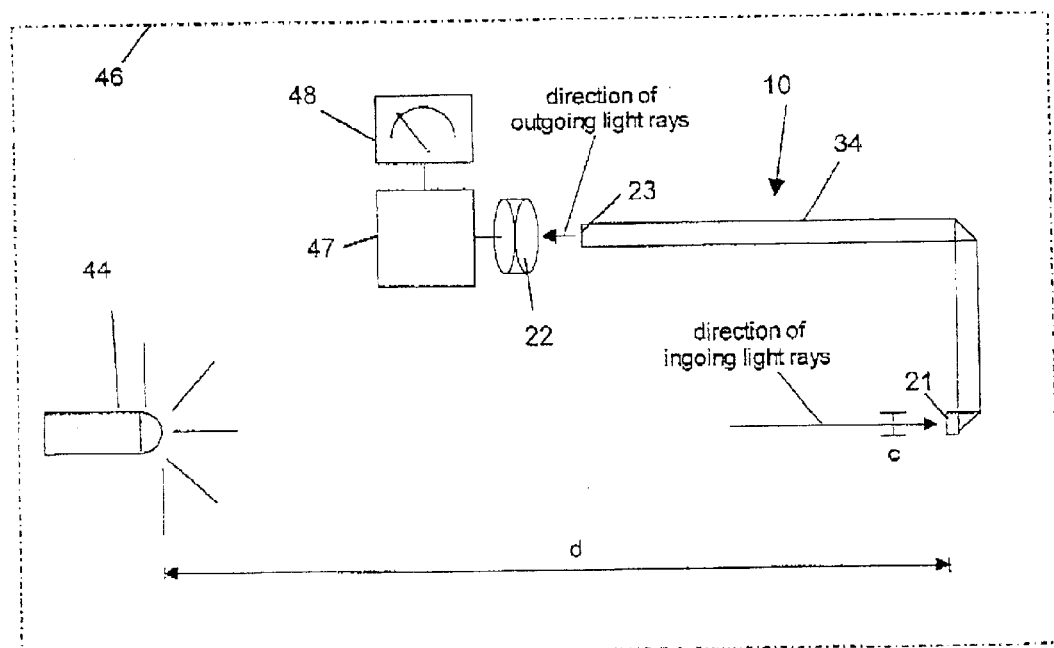
FIG. 7 shows a measurement set-up to measure angle dependency of optical attenuation in a light guide.

A third and preferred embodiment of an optical sensor unit according to the present invention is shown in FIG. 4–FIG. 6. In this embodiment, the optical sensor unit 10 comprises a light guide 34 made of one piece of PMMA. The optical sensor unit 10 furthermore comprises an aperture 21 at one extremity of the light guide 34, and a photodiode sensor 22 or equivalent device at the other extremity of the light guide 34. The light guide 34 can have a non-uniform cross-section in order to concentrate light to the light exit plane 23.

Light rays travel by total internal reflection through the light guide 34. At 90° angles, the light rays are deflected by reflective areas 28, 30, which are for example metallised to serve as a mirror, as in the first embodiment. The structure of this light guide 34 is rigid and simple to make.

In an improvement of the structure (see FIG. 5), a reflective coating 36 is applied directly or indirectly (i.e. non separable or separable) to the outer surface of the light guide 34, with exception of the areas where light is coupled in (aperture 21) or out (light exit plane 23). The reflection coefficient of this reflective coating material 36 is 0.9 or lower. The coating lays at the surface of the light guide 34 and may not penetrate in it.

In this case, ambient light is very well rejected. At the same time, the structure provides a narrow acceptance angle: light rays that enter the light guide 34 under a wide angle to the normal to the active display area 6, such as the ray represented by the dashed line 38, will be reflected and attenuated much more (because the reflection coefficient being 0.9 or lower) than the ray as represented by the dotted line 40 which enters the structure under a narrow angle to the normal to the active display area 6.

The structure can further be modified to change the acceptance angle, as shown in FIG. 6. By selectively omitting the reflective layer 36 on the surface of the light guide 34, at places where the structure is not exposed to ambient light (e.g. where it is covered by a display housing 42), the light rays travelling under a large angle to the axis of the light guide 34 (or to the normal to the active display area 6) can be made to exit the optical sensor unit 10, while ambient light cannot enter the light guide 34.

In this way, light rays that enter the light guide 34 under a wide angle to the normal to the active display area 6, such as a light ray represented by dashed line 38, will be further attenuated and even be allowed to exit the light guide 34. Light rays that enter the light guide 34 under a small angle to the normal of the active display area 6, such as a light ray represented by dotted line 40, will be less attenuated and will only leave the light guide 34 at the level of the light exit plane 23 and photodiode sensor 22. Therefore, the light guide 34 is much more selective as a function of entrance angle of the light rays. This means that this light guide 34 realises a narrow acceptance angle.

By the small acceptance angle of the optical sensor unit 10 according to the present invention, it is avoided that ambient light enters the photodiode sensor 22, and this without having to shield from the ambient light neighbouring pixels to the pixels on which the measurement is done. Also light emitted by the LCD screen at shallow angles to its surface do not enter the sensor. Light emitted from LCD displays at angle away from the normal to the surface are often distorted in luminance and colour.

In order to measure the acceptance angle characteristics of an optical sensor unit 10, test conditions and equipment as hereinafter described, have been used. A light source 44 with white uniformity light output, such as a Hoffman light source type LS-65-GF/PS, has been placed in a dark room 46. A light guide 34 according to the present invention is placed with its aperture 21 in front of the light guide 34, in first instance such that light is entering the aperture 21 in a direction perpendicular to the aperture 21. A preferred requirement of the measurement set-up is that, the distance d between the light source 44 and the aperture 21 of the light guide 34 is equal to or larger than 50 times the width c of the aperture surface of the light guide 34. This is to limit the angular spread of light entering the light guide. For example, the width c of the aperture 21 may be 3 mm, and the distance between the light source 44 and the aperture 21 of the light guide 34 may be 17 cm. In this way, most incoming light rays for practical purposes are perpendicular to the entrance of the optical sensor unit 10. Light coming out of the light guide 34 at the light exit plane 23 is captured by a photodiode 22, and the measured light is converted to a voltage by a light-to-voltage converting circuit 47 (linear circuit), which voltage is measured by a digital voltmeter 48, such as e.g. a type PM2525 of Philips. A flat table is provided, of which a portion can rotate in the plane of the table around a vertical axis. A protractor (not represented), e.g. supplied by Helios, is provided to measure the rotation of the rotatable part of the table.

The light guide 34 is fixed to the rotatable part of table to allow rotation of the light guide 34 in a plane parallel to the line connecting the light source 44 and the aperture 21 of the light guide 34. After the alignment, the light source 44 is fixed to the non-rotatable part of the table. Alternatively, the light guide 34 may be fixed to the fixed part of the table, and the light source 44 fixed to the rotatable part of the table.

Measurements at 0° means that light entering the light guide 34 is travelling parallel to the optical axis of the light source 44. In this position, the light input of the optical system is at maximum. Measurements at 90° means that the light entering the light guide 34 is perpendicular to the optical axis of the light source 44. In this position, the light input of the optical system is at minimum. Note that an measured at an angle a° refer to an acceptance angle of 2a° because the acceptance angle is the subtended angle of extreme rays.

Figure 8:
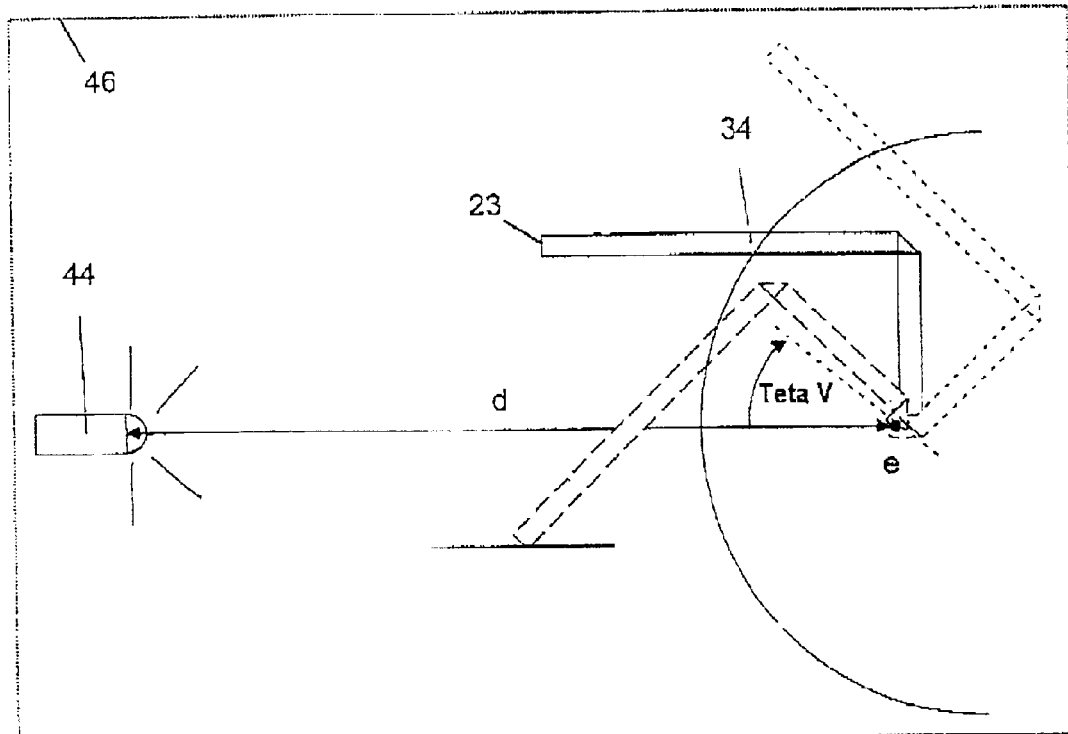
FIG. 8 illustrates how to measure the vertical angle dependency of the optical attenuation in a light guide.

A suitable method of measurement is as follows. The rotating part of the rotating table is rotated with 1° (around point e, see FIG. 8) until 15° is reached. A protractor is used therefor. Then steps of 5° are applied until 50° is reached. Finally steps of 10° are applied up to 90°. At every step, the corresponding measured voltage is noted.

Figure 9:
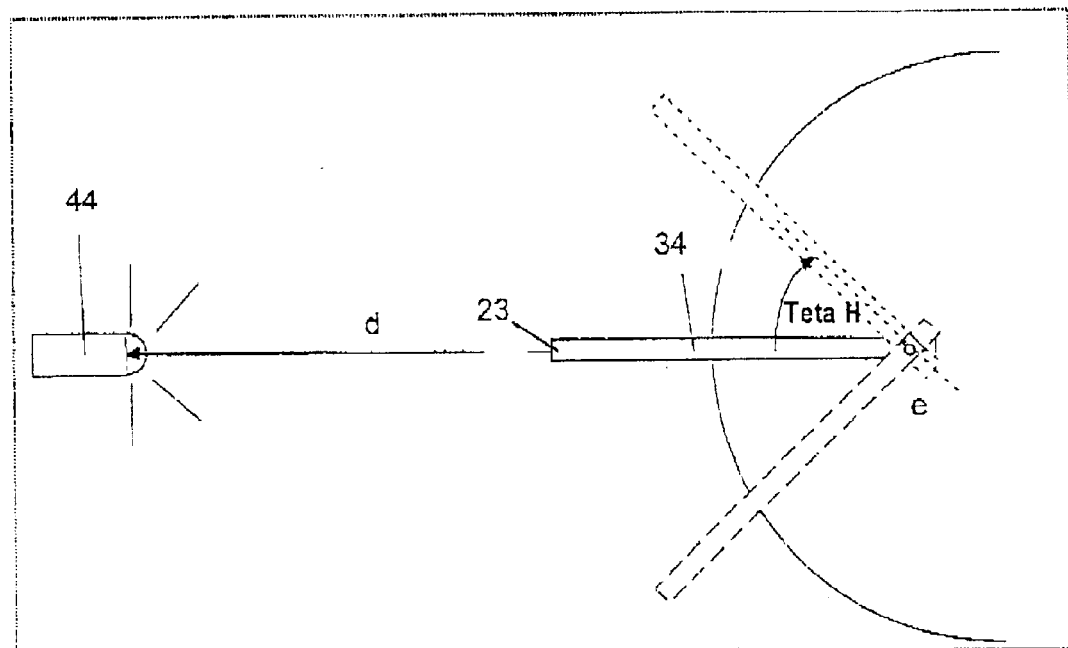
FIG. 9 illustrates how to measure the horizontal angle dependency of the optical attenuation in a light guide.

Since the angle is two-dimensional, the position of the entrance of the optical system is preferably rotated in a perpendicular direction too (see FIG. 9). The amount of steps taken depends on the symmetrical properties of the optical sensor unit 10.

Since the light guide 34 usually has symmetrical properties, the graphs obtained (FIG. 10A and FIG. 10B) can be mirrored around 0°. Every measurement has to be done in a dark room, so that there are no external influences of light. The ambient temperature is typically chosen to be that relevant for the operation of the LDC, e.g. 25°.

Figure 10A:
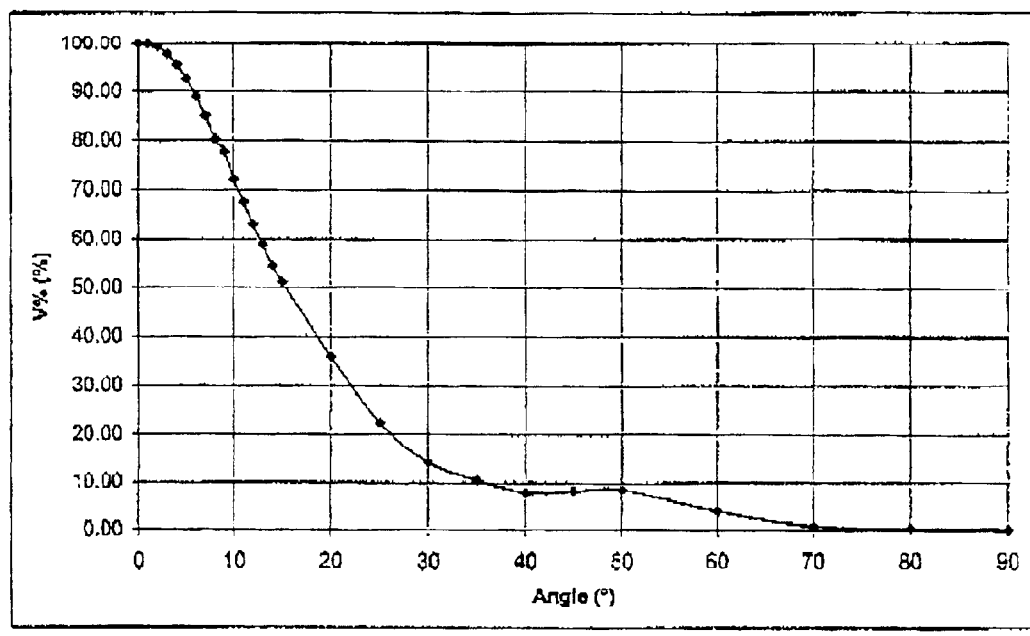
FIG. 10A and FIG. 10B show the results for respectively the vertical and the horizontal angle dependency of the optical attenuation in a light guide, measured as illustrated in FIG. 7–FIG. 9.
Figure 10B:
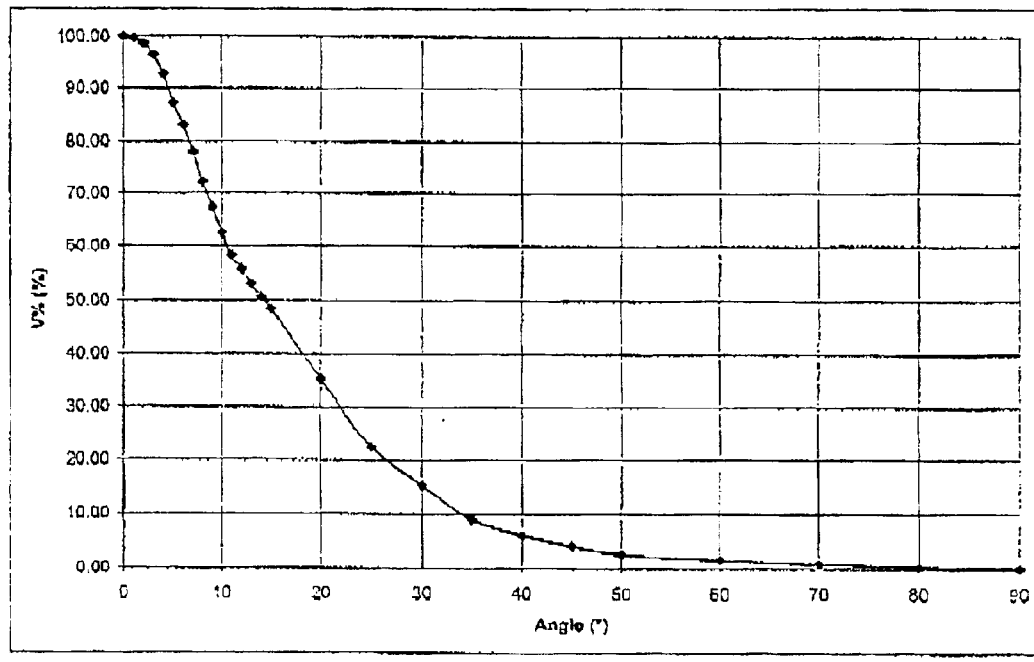

FIG. 10A and FIG. 10B show the measurement results, relevant to the characteristics determined with horizontal and the vertical rotation respectively. With linear interpolation, the measured values in volt are transformed to values in percent. The graphs show narrow characteristics.

When looking at the horizontal characteristic, when $V_\%$ drops to 50% of the light received at 0°, the angle is about 15°. For light rays arriving at 35°, only about 10% of the light is received.

The graph for the vertical characteristic shows no real differences with the graph for the horizontal characteristics.

As shown in the graphs the acceptance angle of a light guide according to the present invention is such that light arriving at an angle of 10° or greater to the optical axis (20° acceptance angle) is attenuated by at least 25%, light arriving at an angle of 20° or greater (acceptance angle 40°) is attenuated by at least 50 or 55% and light arriving at an angle of 35° or greater (acceptance angle of 70°) is attenuated by at least 80 or 85°.

Accordingly it has been found that the step of making optical measurements can comprise selecting light for use in the control step by attenuating light travelling at angles with a normal to the active display area which are equal to or larger than 10° by at least 25%, attenuating light travelling at angles with a normal to the active display area which are equal to or larger than 20° by at least 50 or 55%, and attenuating light travelling at angles with a normal to the active display area which are equal to or larger than 35° by at least 80 or 85%.

The area under the curves between two angles gives a value for the amount of light accepted between these angles. One aspect of the present invention is to reduce the effect of light which comes from angles well away from the normal to the display area (as this may be distorted in hue and/or luminance). Hence, in accordance with another aspect of the present invention the ratio of the amount of light received travelling at angle of 15° or less to the normal to the display area to the amount of received light travelling at an angle of greater than 15° to the normal is X:1 where X is 1 or greater. The physical arrangement of the optical aperture and the length of the light guide provide this exclusion of light at high excident angles.

While the invention has been shown and described with reference to preferred embodiments, it will be understood by those skilled in the art that various changes or modifications in form and detail may be made without departing from the scope and spirit of this invention. For example dimensions of the optical sensor unit can be varied (a bigger or smaller optical sensor unit), thus also the dimensions of the measurement zone can be bigger or smaller. Also the geometry of the optical sensor unit can be varied. Even if geometry and/or dimensions of the optical sensor unit are changed, preferably the optical sensor unit stands out above the active display area by a distance lower than 0.5 cm. Furthermore, applications may be slightly different. For example, the luminance can be measured for each colour, either sequentially or by a combination of sensors with appropriate filters, to measure or stabilise the colour temperature, which is defined by the mixture of the primary colours, in most cases R, G and B. As another example, the method and device can be used to stabilise the contrast value of the luminance measured with the described system, and the ambient light measured with a second sensor which does not point at the active area of the display, but which points at the room environment or to a non-active border of the display. In this case, the display of the image on the active display area is controlled in accordance with the optical measurement signals in combination with the ambient light measurement signals.

What is claimed is:

1. A system for real time correction of light output and/or colour of an image displayed on a display device (1), the system comprising:
    a display device (1) comprising an active display area (6) for displaying the image, an image forming device (2) and an electronic driving system (4) for driving the image forming device (2),
    an optical sensor unit (10) comprising an optical aperture (21) and a light sensor (22) having an optical axis, to make optical measurements on a light output from a representative part of the active display area (6) of the image forming device (2) and generating optical measurement signals (11) therefrom,
    a feedback system (12) receiving the optical measurement signals (11) and on the basis thereof controlling the electronic driving system (4),
    wherein the optical aperture (21) of the optical sensor unit (10) has an acceptance angle such that at least 50%, alternatively 60%, alternatively 70%, alternatively 75% of the light received by the light sensor (22) comes from light travelling within 15° of the optical axis of the light sensor (22).

2. A system according to claim 1, wherein the optical measurements are luminance measurements.

3. A system according to claim 2, wherein light output correction comprises luminance and/or contrast correction.

4. A system according to claim 1, wherein the optical sensor unit (10) furthermore comprises a light guide (34) between the optical aperture (21) and the light sensor (22).

5. A system according to claim 4, wherein the light guide (34) is a light pipe.

6. A system according to claim 5, wherein the light pipe is coated in order to shield ambient light.

7. A system according to claim 6, wherein the coating (36) does not penetrate into the material of the light pipe.

8. A system according to claim 4, wherein the light guide is (34) an optical fibre (32).

9. A system according to claim 1, wherein the optical aperture (21) of the optical sensor unit (10) masks a portion of the active display area (6), while the light sensor (22) does not mask any part of the active display area (6).

10. A system according to claim 1, wherein the optical sensor unit stands out above the active display area a distance of 5 mm or less.

11. A system for real time correction of light output and/or colour of an image displayed on a display device (1), the system comprising:
    a display device (1) comprising an active display area (6) for displaying the image, an image forming device (2), and an electronic driving system (4) for driving the image forming device (2), an optical sensor unit (10) comprising an optical aperture (21) and a light sensor (22) having an optical axis, to make optical measurements on a light output from a representative part of the active display area (6) of the image forming device (2) and generating optical measurement signals (11) therefrom, a feedback system (12) receiving the optical measurement signals (11) and on the basis thereof controlling the electronic driving system (4), wherein the optical aperture (21) of the optical sensor unit (10) has an acceptance angle such that light arriving at an angle with the optical axis of the light sensor (22) which is 10° or greater is attenuated by at least 25%, light arriving at an angle of 20° or greater is attenuated by at least 55% and light arriving at an angle of 35° or greater is attenuated by at least 85%.

12. A system according to claim 11, wherein the optical measurements are luminance measurements.

13. A system according to claim 12, wherein light output correction comprises luminance and/or contrast correction.

14. A system according to claim 11, wherein the optical sensor unit (10) furthermore comprises a light guide (34) between the optical aperture (21) and the light sensor (22).

15. A system according to claim 14, wherein the light guide (34) is a light pipe.

16. A system according to claim 15, wherein the light pipe is coated in order to shield ambient light.

17. A system according to claim 16, wherein the coating (36) does not penetrate into the material of the light pipe.

18. A system according to claim 14, wherein the light guide is (34) an optical fibre (32).

19. A system according to claim 11, wherein the optical aperture (21) of the optical sensor unit (10) masks a portion of the active display area (6), while the light sensor (22) does not mask any part of the active display area (6).

20. A system according to claim 11, wherein the optical sensor unit stands out above the active display area a distance of 5 mm or less.

21. A system according to any of claims 1, wherein the representative part of the active display area (6) of the image forming device (2) is less than 1% of the area of the active display area (6) of the image forming device (2), preferably less than 0.1%, still more preferred less than 0.01%.

22. A method for real time correction of light output and/or colour of an image displayed on a display device (1), comprising:

displaying the image on an active display area (6) on the display device (1), making optical measurements on light emitted from a representative part of the active display area (6) and generating optical measurement signals (11) therefrom, controlling the display of the image on the active display area (6) in accordance with the optical measurement signals (11), wherein the step of making optical measurements comprises selecting light such that the ratio between the amount of light used for control which is emitted or reflected from the display area at a subtended acceptance angle of 30° or less to the amount of light used for control which is emitted or reflected from the display area at a subtended acceptance angle of greater than 30° is X:1 where X is 1 or greater.

23. A method according to claim 22, for carrying out luminance measurements.

24. A method according to claim 23, wherein light output correction comprises luminance and/or contrast correction.

25. A method for real time correction of light output and/or colour of an image displayed on a display device (1), comprising:

displaying the image on an active display area (6) on the display device (1), making optical measurements on light emitted from a representative part of the active display area (6) and generating optical measurement signals (11) therefrom, controlling the display of the image on the active display area (6) in accordance with the optical measurement signals (11), wherein the step of making optical measurements comprises attenuating light travelling at angles with a normal to the active display area (6) which are equal to or larger than 10° by at least 25%, attenuating light travelling at angles with a normal to the active display area (6) which are equal to or larger than 20° by at least 55%, and attenuating light travelling at angles with a normal to the active display area (6) which are equal to or larger than 35° by at least 85%.

26. A method according to claim 25, for carrying out luminance measurements.

27. A method according to claim 26, wherein light output correction comprises luminance and/or contrast correction.

28. A method according to any of claims 22, wherein the step of making optical measurements comprises transmitting light from within the active display area (6) to outside the active display area (6).

* * * * *